(12) United States Patent
Norling et al.

(10) Patent No.: US 8,647,749 B2
(45) Date of Patent: Feb. 11, 2014

(54) MULTI-PLY PLATFORMS AND PANELS USING SUCH A PLATFORM

(75) Inventors: Hakan Norling, Nacka (SE); Martin Kemmsies, Alm. Tamandare (BR)

(73) Assignee: Perennial Brazil Comercio de Madeiras LTDA, Almirante Tamandare (BR)

( * ) Notice: Subject to any disclaimer, the term of this patent is extended or adjusted under 35 U.S.C. 154(b) by 420 days.

(21) Appl. No.: 12/667,101

(22) PCT Filed: Jul. 25, 2008

(86) PCT No.: PCT/SE2008/050894
§ 371 (c)(1),
(2), (4) Date: Dec. 29, 2009

(87) PCT Pub. No.: WO2009/014492
PCT Pub. Date: Jan. 29, 2009

(65) Prior Publication Data
US 2010/0326011 A1    Dec. 30, 2010

Related U.S. Application Data

(60) Provisional application No. 60/951,743, filed on Jul. 25, 2007.

(51) Int. Cl.
| | |
|---|---|
| *B32B 21/00* | (2006.01) |
| *B32B 21/04* | (2006.01) |
| *B32B 21/13* | (2006.01) |
| *B32B 21/14* | (2006.01) |
| *B32B 3/00* | (2006.01) |
| *B32B 5/00* | (2006.01) |
| *B32B 7/00* | (2006.01) |
| *B32B 3/02* | (2006.01) |
| *B32B 3/14* | (2006.01) |
| *E04C 2/00* | (2006.01) |
| *E04C 2/10* | (2006.01) |

(52) U.S. Cl.
USPC .......... 428/537.1; 428/60; 428/105; 428/106; 428/114; 428/192; 52/390; 52/392; 52/796.1

(58) Field of Classification Search
USPC ............... 428/105, 106, 114, 537.1, 192, 60; 52/390, 392, 796.1; 156/299
See application file for complete search history.

(56) References Cited

U.S. PATENT DOCUMENTS 3,715,257 A * 2/1973 Dunaway et al. ............. 156/299
4,012,548 A * 3/1977 Roberti ........................ 428/106
(Continued)

FOREIGN PATENT DOCUMENTS

AU           412448 B2    7/1967
DE      196 52 164 A1    6/1998
(Continued)

OTHER PUBLICATIONS

International Search Report, dated Nov. 26, 2008, from corresponding PCT application.

(Continued)

*Primary Examiner* — Maria Veronica Ewald
*Assistant Examiner* — Joanna Pleszczynska
(74) *Attorney, Agent, or Firm* — Young & Thompson

(57) ABSTRACT

The object of the present invention is to provide multi-ply platforms suitable for the manufacture of decorative panels and decorative panels incorporating such multi-ply platforms, which multi-ply platforms improve the resistance to deformation caused by changes in relative humidity and/or temperature of, or around, such decorative panels. This object is achieved by providing multi-ply platforms comprising a plurality of plies which are arranged so that the platform is substantially unbalanced around its central plane. The unbalanced platform is achieved by, arranging the plies such that at least two adjacent plies have substantially the same main grain direction and/or that two plies having substantially the same main grain direction are separated only by one or more neutral plies. These unbalanced platforms are intended to be bonded to a further ply to form a substantially balanced decorative panel.

16 Claims, 5 Drawing Sheets

(56) References Cited

U.S. PATENT DOCUMENTS

| | | | |
|---|---|---|---|
| 4,131,705 A | 12/1978 | Kubinsky | |
| 4,844,763 A | 7/1989 | Robbins | |
| 5,418,034 A | 5/1995 | McGuire, III | |
| 6,004,648 A | 12/1999 | Snyder | |
| 2005/0003147 A1* | 1/2005 | Torrey | 428/114 |
| 2005/0123728 A1* | 6/2005 | Reichwein et al. | 428/192 |

FOREIGN PATENT DOCUMENTS

| | | |
|---|---|---|
| JP | 9096171 A | 4/1997 |
| JP | 2005232781 A | 9/2005 |
| WO | WO 97/38187 A1 | 10/1997 |

OTHER PUBLICATIONS

Extended European Search Report dated Jun. 6, 2012, from corresponding EP application.

* cited by examiner

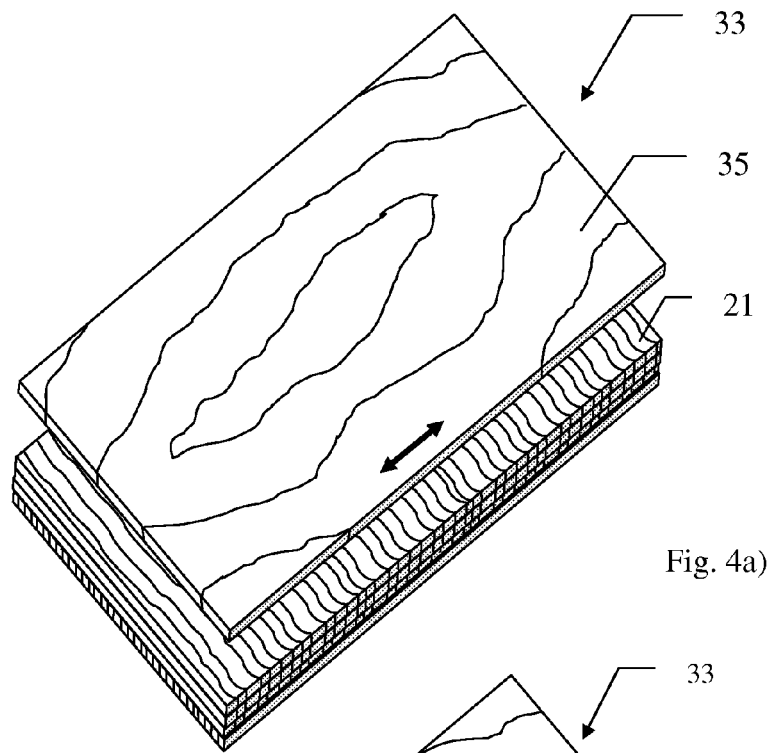
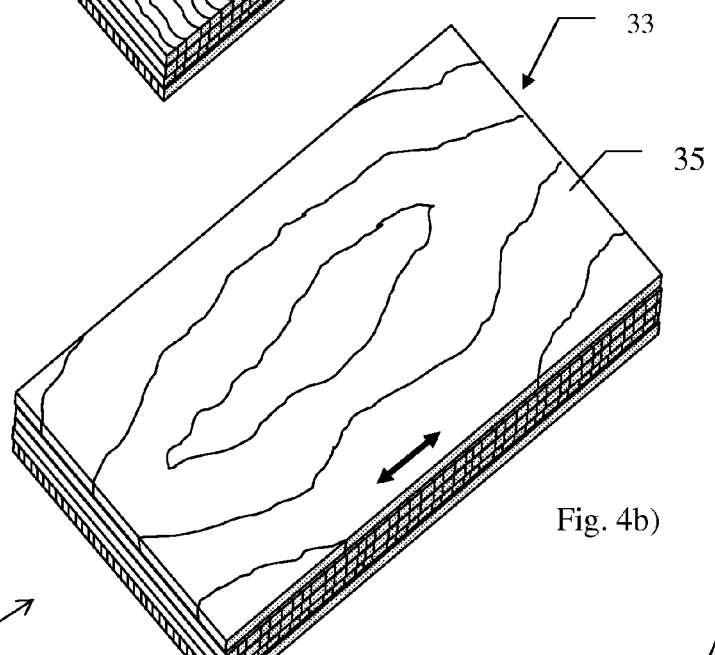
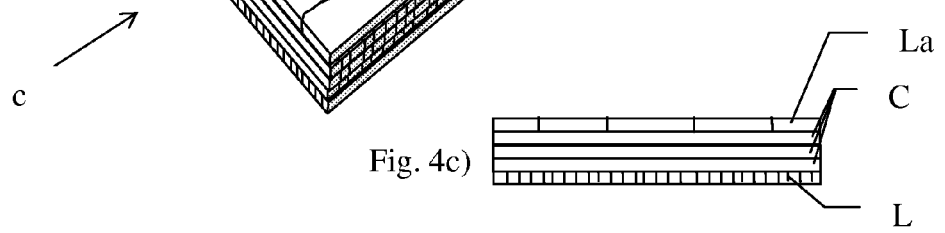

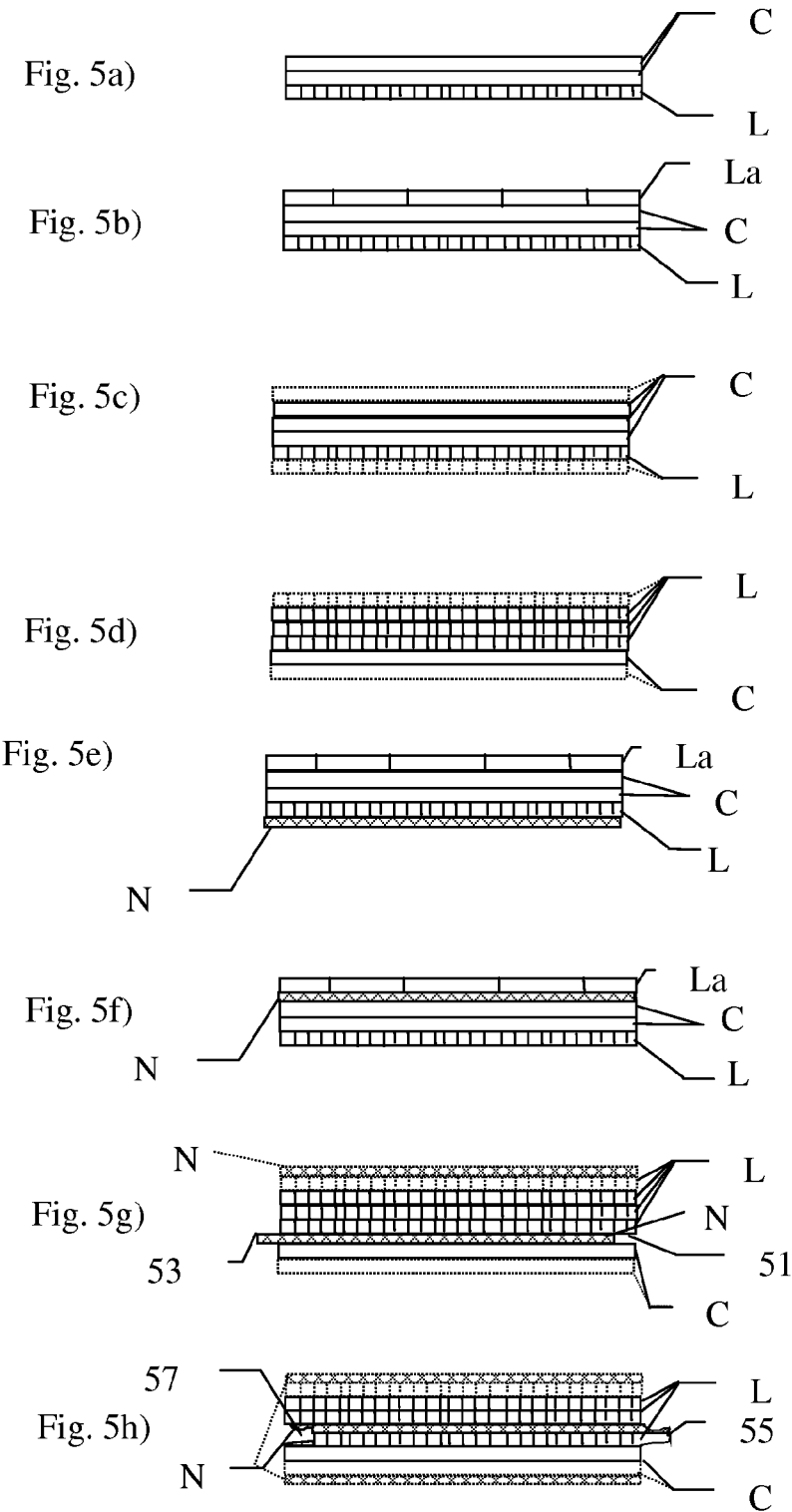

MULTI-PLY PLATFORMS AND PANELS USING SUCH A PLATFORM

FIELD OF THE INVENTION

The present invention relates to multi-ply platforms for the manufacture of floor and wall panels and floor and wall panels made using such multi-ply platforms.

BACKGROUND ART

Plywood is an example of a multi-ply product—that is a product which is made of a plurality of layers of sheet material in which the faces of adjacent sheets are bonded to each other. Plywood is a panel product manufactured by gluing together one or more veneers to both sides of a veneer, solid wood, or reconstituted wood core. In the case of solid-wood-core plywood and reconstituted-wood-core plywood, an additional intermediate step is the production of cores, which are made by lateral gluing of blocks or strips of wood or by gluing oriented wood chips with resin adhesives. Plywood has many advantages over natural wood, an important one being greater dimensional stability. Its uniformity of strength, resistance to splitting, panel form, and decorative value make it adaptable to various uses.

In plywood, both structural and decorative plywood, the grain of alternate layers is typically crossed, in general at right angles and the species, thickness, and grain direction of each layer are matched with those of their opposite number on the other side of the core or central veneer. The total number of layers of veneers is typically odd (three, five, or more) so that the physical properties of the plywood are balanced around its central plane (i.e. the plane parallel to the faces of the plywood and passing though the mid-line of the plywood) i.e. it has approximately the same physical properties (e.g. expansion/contraction with changes of temperature and/or humidity) on both sides of the midline. In other words, the potential for dimensional change when subject to changes of ambient temperature and/or humidity must be equal on the two sides of the panel at equal distances from the centre of the panel. Preferably in moving from the centre of a panel outward toward the surfaces, the panel makeup should be a mirror image on both sides of the panel. Balanced plywood is stable and less likely to cup, warp, shrink or swell. Laminating an odd number of plies [3, 5, 7 . . . ] reduces warping while increasing the number of plies increases the resistance to shearing forces.

Typically the grain direction of the two surface veneers (the front and back faces) is parallel to the longer dimension of rectangular sheets. Three-ply is stronger along the surface grain axis, but as the number of plies increase, the lengthwise/crosswise strengths and stiffness of a plywood sheet will become more equal. Three-ply bends easier along the grain direction of the surface plies because only the middle core ply will have crosswise grain. To ensure the strength and stiffness characteristics of three-ply in the face grain direction it is required that the thickness of each surface veneer is between 25% and 33% of the total sheet thickness, i.e. the two surface sheets comprise 50% to 66% of the total sheet thickness.

The outer plies may be called the 'faces' (or the 'face' and 'back') and the intermediate plies may be called the 'crossbands'. In order to procure a balanced panel, with five or more plies the total thickness of the odd numbered plies [number 1 being a face ply] should be about the same total thickness as the even numbered plies.

Plywood is often used as a platform for decorative veneers or lamellae used in floor or wall panels. During the manufacture of such floor or wall panels (called "decorative panels" in the following for the sake of brevity, but without implying that the invention is restricted to panels having an attractive decorative veneer or lamella) a decorative veneer or a decorative solid wood sawn lamella, usually of a thickness of 2-4 mm in Europe but as little as 0.2 mm in Asia, of a decorative wood is attached, using by gluing, to one of the faces of a sheet of plywood. This leads to an unbalanced product as the formerly balanced plywood platform has the decorative veneer only attached to one face. When such decorative panels are subjected to changes in relative humidity, e.g. from 10% relative humidity during the winter months to 80-90% relative humidity during the summer, or large changes of temperature, deformations in the decorative surface may occur as the swelling and contraction of the fibres of the decorative veneer cannot be balanced by the underlying plywood platform.

SUMMARY OF THE INVENTION

An object of the present invention is to provide multi-ply platforms suitable for the manufacture of decorative panels, and decorative panels incorporating such multi-ply platforms, which multi-ply platforms improve the resistance to deformation caused by changes in relative humidity and/or temperature of, or around, such decorative panels.

The present invention achieves the above object by providing multi-ply platforms comprising a plurality of plies in which are arranged so that the platform is substantially unbalanced about its central plane. These unbalanced platforms are intended to be bonded to a further ply to form a substantially balanced decorative panel.

In one embodiment of the present invention this is achieved by providing a multi-ply platform in which a face ply and the adjacent underlying ply have substantially the same grain direction.

In a further embodiment of the present invention this is achieved by providing a multi-ply platform in which a face ply and the adjacent underlying ply and the next adjacent underlying ply have substantially the same grain direction.

In yet a further embodiment of the present invention this is achieved by providing a decorative panel comprising a decorative lamella attached to the face of a multi-ply platform wherein the grain direction of said face and at least the next adjacent ply are substantially the same and are substantially perpendicular to the grain direction of the decorative lamella. Further embodiments of the invention are also described in the following description.

DESCRIPTION OF THE FIGURES

FIG. 4a) shows schematically in perspective, an exploded view of an example of the veneer and plies of a decorated panel using a multi-ply platform in accordance with the first embodiment of the present invention;

FIG. 4b) shows the decorated panel of FIG. 4a) in its assembled state;

FIG. 4c) is an end view of the panel of FIG. 4b) seen from the direction of arrow c in FIG. 4b);

FIG. 5a) shows schematically an end view of a second embodiment of a multi-ply platform in accordance with the present invention;

FIG. 5b) shows schematically an end view of a decorated panel using a multi-ply platform in accordance with the second embodiment of the present invention;

FIGS. 5c) to 5h) shows schematically end views of multi-ply platforms in accordance with the further embodiments of the present invention.

DETAILED DESCRIPTION OF THE INVENTION

Figure 1A:
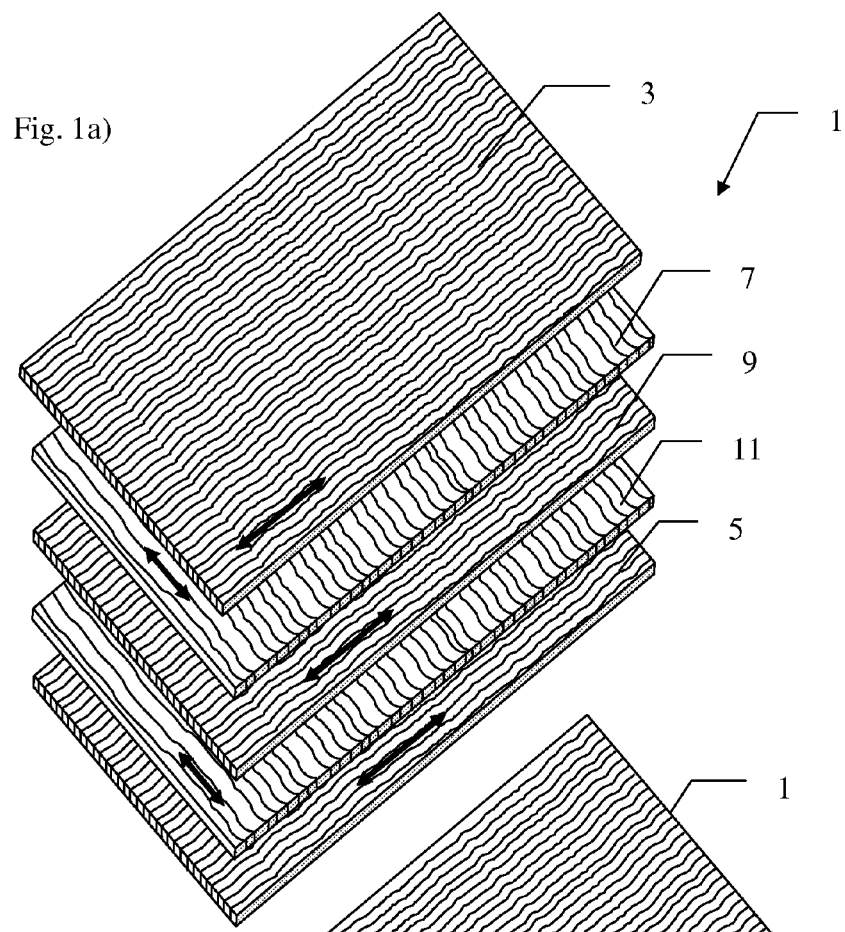
FIG. 1a) shows schematically in perspective, an exploded view of the plies of a prior art 5-ply plywood sheet.

In the following it is assumed merely for the sake of brevity that multi-ply platforms and decorated panels in accordance with the present invention have a rectangular shape of defined length, width and thickness wherein the thickness is less than the length and width, however the present invention is applicable to panels and platforms of any shape. Furthermore the term multi-ply is not intended to be limited to panels and platforms consisting only of wooden plies, but is intended to encompass any multi-ply constructions in which one or more plies are made of a material which has properties in one direction which are different to the properties in the same ply in a substantially orthogonal direction, one of these directions being defined the grain (or longitudinal) direction, the other being defined the cross direction, and/or one or more plies is made of medium density fibreboard (MDF), high density fibreboard (HDF), woven material, non-woven materials, paper, impregnated paper, metal (e.g. aluminium), foil, plastics, polymer material, composite materials, rubber and/or any other material which can provide a desired characteristic (for example, one or more of the following non-exhaustive list of desirable characteristics: improved strength, improved flexibility, reduced flexibility, improved water-resistance, improved machineability, local reinforcement at high-stress regions (e.g. where panels are intended to provided with mutually cooperating features which allow panels to be joined together), reduced sensitivity to moisture, better sound-damping) to the panel or platform—these plies can be solid or perforated and optionally provided with features such as ribs, grooves, projections and depressions to give desired mechanical properties and/or to improve bonding between plies. The following terminology will be used: the longest dimension of the platforms and panels extends in the longitudinal direction, and plies, veneers or the like having their grain in the longitudinal direction will be called longitudinal grain panels. The direction transverse to the longitudinal direction (i.e. the direction in the plane of a ply at 90° to the longitudinal direction) is the cross direction and plies, veneers or the like having their grain in the cross direction will be called cross grain plies. Plies having no discernable grain (e.g. MDF plies) will be called neutral plies. While neutral plies have no discernable grain it is possible that to make plies which have different properties in the longitudinal and cross directions, for example by selecting the orientation of fibres in composite materials or by adding strengthening ribs or the like to panels and in such panels if the axis with the greatest resistance to bending is the longitudinal axis then such panels will be considered to be equivalent to longitudinal grain panels. Similarly if the axis with the greatest resistance to bending is the transverse axis then such panels will be considered to be equivalent to cross grain panels. The direction perpendicular to the plane of a ply is called the thickness. Thus in platform or panel having dimensions of 2400 mm×1200 mm×15 mm, the longitudinal direction extends for 2400 mm, the transverse direction extends for 1200 mm and the platform or panel is 15 mm thick. Grain direction is illustrated by thick, double-ended arrows in the figures.

FIG. 1a) shows an exploded view of a prior art 5-ply plywood sheet 1. Sheet 1 comprises 5 veneers, 3, 5, 7, 9, 11 arranged in a pile with their edges aligned. Veneers 3 and 5 are face plies—i.e. they have a face surface that is exposed and each has its grain substantially aligned in the longitudinal direction of the sheet 1—a ply or veneer with its grain substantially aligned in the longitudinal direction will henceforth will be called a longitudinal grain ply (or "L"). The middle ply 9 is also a longitudinal grain ply. Positioned adjacent to both sides of the middle ply 9 are intermediate plies 7, 11. These plies each have their grain in the cross direction and a ply or veneer with its grain substantially aligned in the cross direction will henceforth will be called a cross grain ply ("C")

Figure 1B:
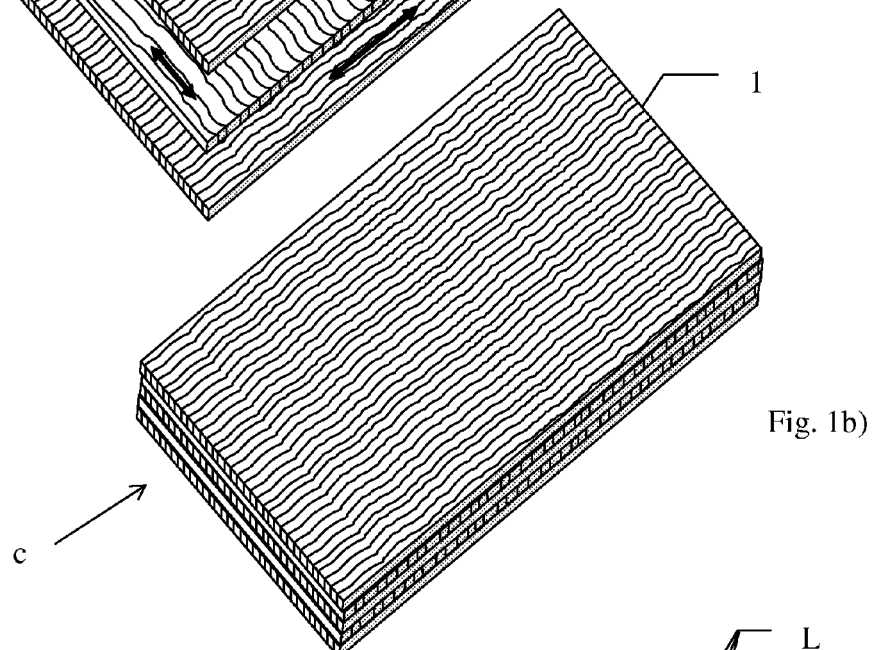
FIG. 1b) shows the sheet of FIG. 1a) in its assembled state.
Figure 1C:
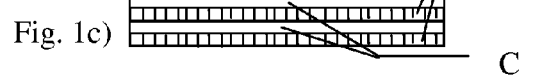
FIG. 1c) is an end view of the platform of FIG. 1b) seen from the direction of arrow c in FIG. 1b)

FIGS. 1b) and 1c) show the plies of FIG. 1a) assembled into a plywood sheet—not shown is the adhesive applied between contacting faces in order to hold the plies together. This has 5 plies arranged L-C-L-C-L. This is a balanced plywood sheet as the number of plies and the directions of their grains are symmetrical about the central plane of the sheet.

Figure 2A:
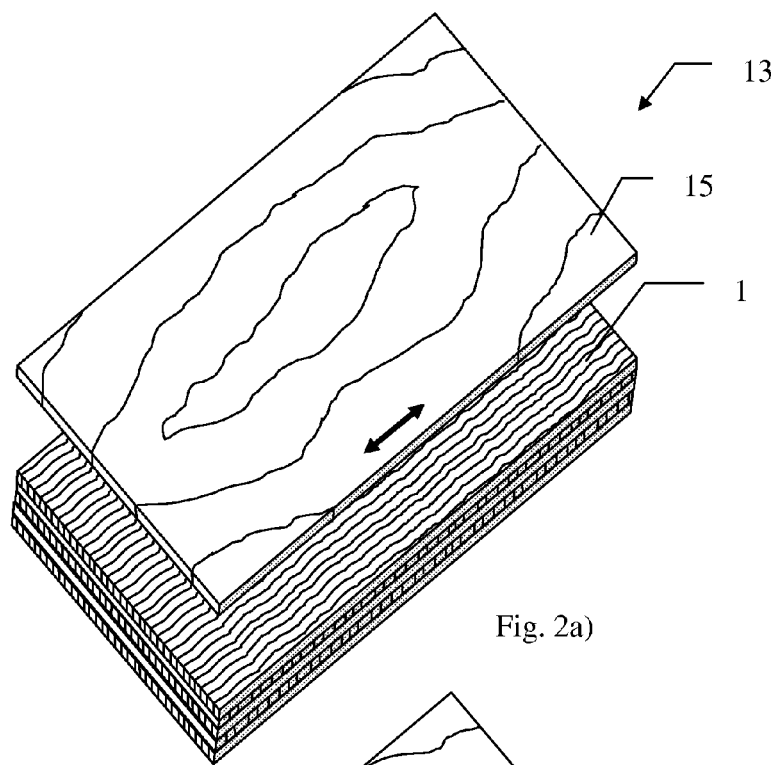
FIG. 2a) shows schematically in perspective, an exploded view of an example of the veneer and plies of a prior art decorated plywood panel.

FIG. 2a) shows an exploded view of a prior art decorated plywood panel 13. Decorated plywood panel 13 comprises a plywood panel covered by a decorative lamella 15. Depending on the type of decorated plywood panel being made lamella 15 can be a peeled, sliced or sawn sheet of material, usually wood if the decorated plywood panel is to be used for walls or flooring. The grain direction of the material of lamella 15 is in the longitudinal direction so it is a longitudinal grain ply.

Figure 2B:
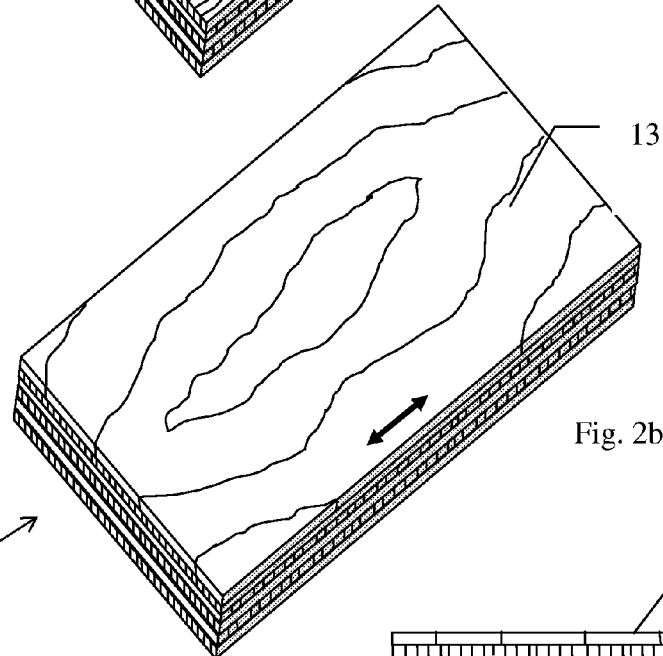
FIG. 2b) shows the decorated plywood panel of FIG. 2a) in its assembled state.
Figure 2C:
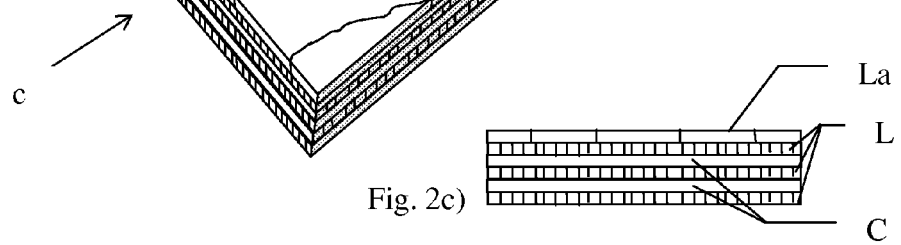
FIG. 2c) is an end view of the panel of FIG. 2b) seen from the direction of arrow c in FIG. 2b)

FIGS. 2b) and 2c) show the lamella and plywood sheet of FIG. 2a) assembled into a decorated plywood panel 13—not shown is the adhesive applied between contacting faces in order to hold the lamella ("La") and plywood sheet together. This has panel has 6 plies arranged La-L-C-L-C-L. This is an unbalanced panel as the number of plies and the directions of their grains are asymmetrical about the central plane of the sheet. This means that when such a panel is subject to changes in humidity and/or temperature there is a high probability that the panel will deform in an asymmetric manner.

Figure 3A:
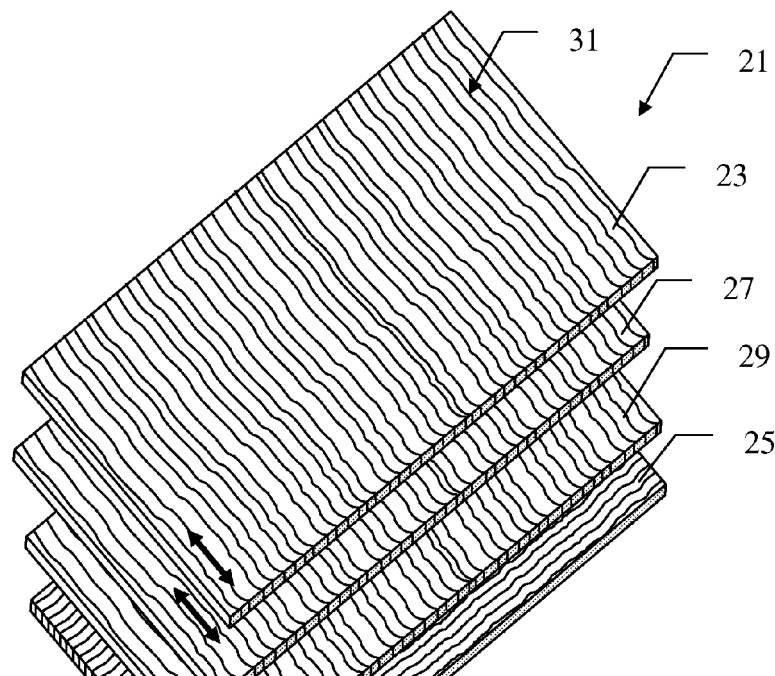
FIG. 3a) shows schematically in perspective, an exploded view of the plies of a 4-ply multi-ply platform in accordance with a first embodiment of the present invention.

FIG. 3a) shows schematically in perspective an exploded view of the plies of a 4-ply multi-ply platform 21 in accordance with a first embodiment of the present invention. Platform 21 is intended to be joined with a decorative lamella which has its grain direction in the longitudinal direction in order to form a decorated panel, e.g. for use as a wall or floor. Platform 21 comprises 4 veneers 23, 25, 27, 29 arranged in a pile with their edges aligned. Contrary to the construction normally used in prior art plywood sheets, the veneers are not arranged with alternating grain directions. Veneer 23 is a face ply and has a visible working surface 31 which is intended to receive a decorative lamella when the platform is made into a decorated panel. Veneer 23 has a grain direction which is substantially perpendicular to the grain direction of the decorative lamella which is intended to be attached to it. Veneer 25 is also a face ply and it has a grain direction which is parallel with the grain direction of the decorative lamella which is intended to be attached to veneer 23. There are two intermediate plies 27, 29 each of which have their grain directions aligned with that of veneer 23. In this example as the multi-ply platform is intended to be used with a wooden decorative lamella (also called "top wear layer") which has its grain direction in the longitudinal direction veneers 23, 27 and 29 are cross grain ply and face veneer 25 is longitudinal grain ply.

Figure 3B:
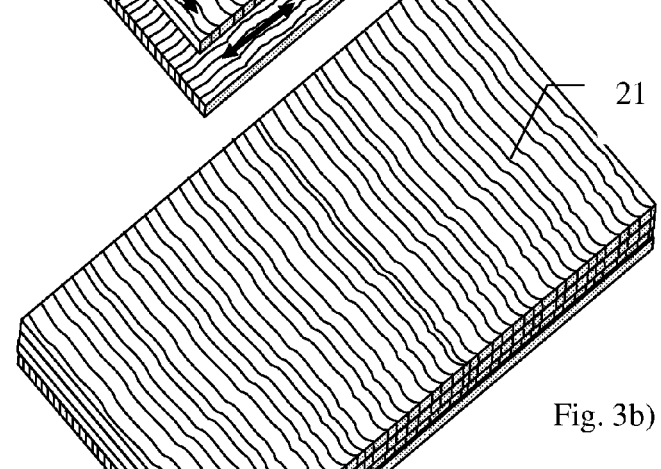
FIG. 3b) shows the multi-ply platform of FIG. 3a) in its assembled state.
Figure 3C:
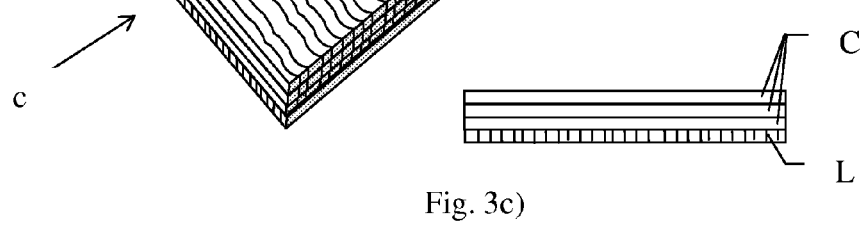
FIG. 3c) is an end view of the platform of FIG. 3b) seen from the direction of arrow c in FIG. 3b)

FIGS. 3*b*) and 3*c*) show the plies of FIG. 3*a*) assembled into a multi-ply platform—not shown is the adhesive applied between contacting faces in order to hold the plies together. This platform 21 has four plies 23, 27, 29, 25 arranged C-C-C-L. This is unbalanced as the number of plies and the directions of their grains are asymmetrical about the central plane of the sheet.

FIG. 4*a*) shows an exploded view of a first embodiment of a decorated multi-ply panel 33 in accordance with the present invention. Decorated multi-ply panel 33 comprises the multi-ply platform 21 covered by a decorative lamella 35. Depending on the type of decorated multi-ply panel being made lamella 35 can be a peeled, sliced or sawn sheet of material, usually wood if the decorated multi-ply panel 33 is to be used for walls or flooring. In order to form a balanced panel the grain direction of the material of the lamella 35 is in the longitudinal direction so it is a longitudinal grain ply.

FIGS. 4*b*) and 4*c*) shows the lamella 35 and multi-ply platform 21 of FIG. 4*a*) assembled into a decorated multi-ply panel 33—not shown is the adhesive applied between contacting faces in order to hold the lamella 35 and multi-ply platform 21 together. This has panel has 5 plies arranged Lamella-C-C-C-L. Preferably the properties of the lamella and plies are matched in strength and density. They may also be matched in thickness. If lamella and all the plies are made of the same material then preferably the lamella 35 and the bottom face ply 25 have the same thickness and the total thickness of lamella 35 and face ply 25 is substantially the same as the total thickness of plies 23, 27 and 29. This will give a balanced panel as the number of plies and the directions of their grains are symmetrical about the central plane of the sheet. In general it is desirable that in a substantially balanced panel using the same type of material for each ply that the combined thickness of longitudinal grain plies is substantially the same as the combined thickness of cross grain plies, however if different types of material are used, e.g dense wood for longitudinal grain plies and less dense wood for cross grain plies then the total thickness of the cross grain plies may need to be thicker than the total thickness of the longitudinal grain plies in order to achieve a balanced panel.

If the grain direction of the material of the lamella is in the cross direction, i.e. it is a cross ply, then in order to achieve a balanced decorated multi-ply panel, the lamella should be attached to a multi-ply platform with a ply structure L-L-L-C, the lamella La being attached to the outermost L ply to form a multi-ply panel with plies arranged La-L-L-L-C.

In a second embodiment of the present invention, an unbalanced multi-ply platform comprises three plies. In the event that the multi-ply platform is intended to be used with a lamella in which the grain direction of the material of the lamella is in the longitudinal direction then the multi-ply platform would have a ply structure C-C-L, the lamella being attached to the outermost C ply to form a multi-ply panel with plies arranged Lamella-C-C-L. Conversely, in the event that the multi-ply platform is intended to be used with a lamella in which the grain direction of the material of the lamella has is in the cross direction then the multi-ply platform would have a ply structure L-L-C, the lamella being attached to the outermost L ply to form a multi-ply panel with plies arranged La-L-L-C.

Other embodiments of unbalanced platforms in accordance with the present invention are also conceivable where more that 3 consecutive plies have substantially the same grain direction, for example C-C-C-C . . . or L-L-L-L . . . , are then followed by one or more plies, at least the first of which has a substantially perpendicular grain direction, i.e. C-C-C-C-L . . . or L-L-L-L-C . . . as shown in FIGS. 5*c*) and 5*d*).

Further embodiments of unbalanced platforms in accordance with the present invention are conceivable in which one or more neutral plies are present. If only one neutral layer is provided then it is may be provided in a position such that when the platform is made into a decorative panel by adding a decorative lamella the central plane of the panel will lie in the neutral ply—for example if the neutral ply is made of some strong but flexible material, such metal or MDF or HDF or composite material or the like, and is intended to form part of a locking system for holding laid panels together. As one alternative the neutral ply can be the ply furthest away from the decorative lamella (for example if the neutral ply is waterproof and is intended to stop water under the platform from penetrating into the platform) as shown in FIG. 5*e*) or as another alternative it can form the ply directly in contact with the lamella (for example if the neutral ply is waterproof and is intended to stop water on the panel from penetrating into the platform) as shown in FIG. 5*f*.

An embodiment of a platform comprising a neutral ply could, for example, have the plies arranged L-L-L-N-C as shown in FIG. 5*g*) (with optional additional N and L shown in dotted lines) and a decorative panel based on this platform could have the plies arranged Lamella-L-L-L-N-C. In this case the lamella would be a cross grain ply. Purely as an example a further embodiment of a platform comprising a neutral ply could have plies arranged L-L-N-L-C as shown in FIG. 5*h*) and a decorative panel based on this platform could have the plies arranged Lamella-L-L-N-L-C. In this case the lamella would be a cross grain ply. Other unbalanced platform arrangements (such as C-N-C-L, C-C-N-C-C-L, etc) are also conceivable and in these examples a substantially balanced decorative panel would have a lamella which has the characteristics of a longitudinal grain ply.

If a neutral ply is thin and flexible, for example, a plastic film intended to act as a vapour or moisture barrier, and therefore doesn't significantly affect the strength of the platform then it can be placed anywhere in the platform without substantially affecting the balance of the final decorative panel.

More than one neutral layer can be incorporated into a platform (as shown by dotted lines in FIGS. 5*g*) and 5*h*)—for example a water-proof plastic film could be provided to reduce the penetration of water into the platform while a MDF, HDF, plastic, polymer, composite material, and a metal ply could be provided to provide local strength and/or flexibility and/or improved machineability—for example if a simple tongue and groove joining system 51, 53 (as shown schematically in 5*g*) or more complicated projection and groove click-lock or snap-lock 55, 57 (as shown schematically in FIG. 5*h*) joining system formed in the edges of the platform is to be used. Such joining systems comprise a projection in one edge of the platform and a corresponding groove in the opposite edge of the platform, the groove being able to receive the projection from an adjacent panel (when the platforms have been made into panels and are being laid together). Possible joining systems are not limited to the examples shown in FIGS. 5*g*) and 5*h*) but can be of any type.

They may be formed in, extend through or comprise more than one ply and are not limited to being formed in neutral plies. Furthermore joining systems are conceivable which use additional components intended to be fitted between adjacent panels during laying (or hanging) of the panels, for example aluminium profiles which are fitted into grooves in the panels, said grooves being adapted to receive and grip the profiles.

An advantage of platforms and multi-ply panels incorporating such platforms in accordance with the present invention is that as the multi-ply panel is balanced, it can be made thinner than a conventional panel intended for the same use. For example, if a conventional floor panel is intended to use a 2 mm thick lamella as the wear surface then in order to achieve good dimensional stability during use, the 2 mm thick lamella is commonly attached to a 10 mm thick 5-ply balanced plywood platform. However, in accordance with the present invention, the same dimensional stability can be achieved by using an unbalanced platform which is only 6 mm thick after sanding. This platform can be made of three 2.1 mm thick plies glued together in C-C-L order. The platform can be sanded which removes 0.15 mm from the face plies resulting in an unbalanced platform which is 6 mm thick with the total thickness of the C-plies totalling 4.05 mm and the L ply being 1.95 mm thick. When a 2 mm lamella is glued to the working surface of the outermost C-ply the result will be an 8 mm thick panel which has Lamella-C-C-L ply arrangement and in which the total thickness of Lamella and L-plies is 3.95 mm and the total thickness of the C-plies is 4.05 mm. This is substantially balanced (the ratio of C-plies to L-plies is almost 1:1) and uses only about ⅔ of the material required for the conventional product.

Furthermore, it is conceivable that in a platform in accordance with the present invention a plurality of consecutive plies with substantially the same grain direction are followed by a plurality of consecutive plies with a substantially perpendicular grain direction e.g. C-C-C-L-L. For example, if a panel is intended to use a 4 mm thick lamella with longitudinal grain then it conceivable that it could be attached to a platform in accordance with the present invention which platform has 5 plies, each nominally 2 mm thick and arranged C-C-C-L-L thereby forming a panel Lamella-C-C-C-L-L. Using ply thicknesses of 4-2.7-2.7-2.7-2-2 mm would give a substantially balanced panel.

In order to make a substantially balanced 20 mm thick multi-ply panel using a 5 mm lamella with grain in the longitudinal direction, an unbalanced platform in accordance with the present invention could be made of five plies arranged C-C-C-L-L. The C-plies can be 3.4 mm thick and the L-plies can be 2.6 mm thick, for a total thickness of 15.4 mm. This platform is unbalanced to the extent that it needs one or more additional plies added onto the exposed C-ply which additional plies are the equivalent of the two longitudinal plies to balance it. After sanding 0.2 mm from each face, the total thickness would be 15 mm of which 10 mm is C-ply and 5 mm L-ply. When the 5 mm thick lamella is glued to the working surface of the outermost C-ply the result is a 20 mm thick substantially balanced panel which has Lamella-C-C-C-L-L ply arrangement and in which the total thickness of Lamella and L-plies is 10 mm and the total thickness of the C-plies is 10 mm.

Alternatively a substantially balanced 20 mm thick multi-ply panel using a 5 mm lamella with grain in the longitudinal direction, can be made using an unbalanced platform with 6 plies arranged C-C-C-C-L-L. This platform is unbalanced to the extent that it needs one or more additional plies added onto the exposed C-ply which additional plies are the equivalent of the two longitudinal plies to balance it. The C-plies can be 2.5 mm thick and the L-plies can be 2.6 mm thick for a total of 15.2 mm. After sanding 0.1 mm from each face, the total thickness would be 15 mm of which 9.9 mm is C-ply and 5.1 mm L-ply. When the 5 mm thick lamella is glued to the working surface of the outermost C-ply the result is a 20 mm thick substantially balanced panel which has Lamella-C-C-C-C-L-L ply arrangement and in which the total thickness of Lamella and L-plies is 10.1 mm and the total thickness of the C-plies is 9.9 mm.

All platforms and panels in accordance with the present invention may be adapted to have one or more of their edges profiled to enable panels and platforms laid adjacent each other to be fastened together by mutually cooperating features such as click-lock, snap-lock or tongue and groove projections and depressions.

The present invention is not limited to the embodiments described and modifications can be made to them without departing from the scope of the invention as set forth in the appended claims.

What is claimed is:

1. Multi-ply platform for the manufacture of a decorative panel, comprising:
    a platform of at least four plies; and
    a decorative lamella,
    wherein the decorative lamella and the plies of the platform each has a main grain direction which is one of i) in a longitudinal direction of the platform, and ii) transverse to the longitudinal direction of the platform,
    wherein the plies are arranged such that a face ply intended to be furthest away from the lamella has substantially the same main grain direction as the main grain direction of the lamella, and
    wherein more than half of the plies other than said face play have i) the other main grain direction which is not the same as the main grain direction of the lamella, and ii) are arranged consecutively.

2. Multi-ply platform according to claim 1 wherein the number of plies and the directions of their main grain directions are asymmetrical about the central plane of the platform.

3. Multi-ply platform according to claim 1 comprising at least one neutral ply (N).

4. Multi-ply platform according to claim 3 wherein said neutral ply comprises medium density fibreboard (MDF), high density fibreboard (HDF), woven material, non-woven materials, paper, impregnated paper, metal, foil, plastic, polymer material, rubber and/or any other material which can provide a desired characteristic to the panel.

5. Multi-ply platform according to claim 1 comprising two opposed edges, one edge provided with a projection and the other edge provided with a groove.

6. Multi-ply platform according to claim 5 wherein said projection and groove form a click-lock joining system.

7. Decorative panel comprising the multi-ply platform according to claim 1.

8. Decorative panel according to claim 7 wherein the number of plies and the direction of the grains of the plies and the lamella are symmetrical about the center plane of said panel.

9. Multi-ply platform for the manufacture of a decorative panel comprising:
    a platform having exactly and only three plies; and
    a decorative lamella, wherein,
    the decorative lamella and the plies each has a main grain direction which is either in the longitudinal direction or transverse to the longitudinal direction of the platform,
    the plies are arranged such that a face ply intended to be furthest away from the lamella has substantially the same main grain direction as the lamella and the other two plies have the other main grain direction.

10. Multi-ply platform according to claim 9 wherein the number of plies and the directions of their main grain directions are asymmetrical about the central plane of the platform.

11. Multi-ply platform according to claim 9 comprising at least one neutral ply (N).

12. Multi-ply platform according to claim 11 wherein said neutral ply comprises medium density fibreboard (MDF), high density fibreboard (HDF), woven material, non-woven materials, paper, impregnated paper, metal (e.g. aluminium), foil, plastic, polymer material, rubber and/or any other material which can provide a desired characteristic to the panel.

13. Multi-ply platform according to claim 9 comprising two opposed edges, one edge provided with a projection and the other edge provided with a groove.

14. Multi-ply platform according to claim 13 wherein said projection and groove form a click-lock joining system.

15. Decorative panel comprising the multi-ply platform according to claim 9.

16. Decorative panel in accordance with claim 15 wherein the number of plies and the direction of the grains of the plies and the lamella are symmetrical about the center plane of said panel.

\* \* \* \* \*

UNITED STATES PATENT AND TRADEMARK OFFICE
CERTIFICATE OF CORRECTION

PATENT NO. : 8,647,749 B2  Page 1 of 1
APPLICATION NO. : 12/667101
DATED : February 11, 2014
INVENTOR(S) : Norling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Twenty-ninth Day of September, 2015

Michelle K. Lee
*Director of the United States Patent and Trademark Office*